US012641322B2

(12) United States Patent
Yerneni et al.

(10) Patent No.: US 12,641,322 B2
(45) Date of Patent: May 26, 2026

(54) SYSTEMS AND METHODS FOR CONTENT PAGE CONFIGURATION

(71) Applicant: DISH Network L.L.C., Englewood, CO (US)

(72) Inventors: Vinaya Sri Yerneni, Englewood, CO (US); Jason Anthony Madruga, Englewood, CO (US); Clark Hurst Pendery, Englewood, CO (US); Girish Pai Mangaldas, Englewood, CO (US); Joshua David Wade, Englewood, CO (US); Dalton Hertel, Englewood, CO (US); Laxminarayana Dalimba, Bangalore (IN)

(73) Assignee: DISH NETWORK L.L.C., Englewood, CO (US)

( * ) Notice: Subject to any disclaimer, the term of this patent is extended or adjusted under 35 U.S.C. 154(b) by 0 days.

(21) Appl. No.: 18/669,174

(22) Filed: May 20, 2024

(65) Prior Publication Data

US 2025/0358485 A1    Nov. 20, 2025

(51) Int. Cl.
*H04N 21/6543* (2011.01)
*H04N 21/2187* (2011.01)
*H04N 21/854* (2011.01)

(52) U.S. Cl.
CPC ..... *H04N 21/6543* (2013.01); *H04N 21/2187* (2013.01); *H04N 21/854* (2013.01)

(58) Field of Classification Search
CPC ........... H04N 21/6543; H04N 21/2187; H04N 21/854
See application file for complete search history.

(56) References Cited

U.S. PATENT DOCUMENTS 9,720,888 B1 * 8/2017 Jain ..................... G06F 16/9577
2005/0177401 A1 * 8/2005 Koeppel ............ G06Q 30/0201
705/4
2024/0348856 A1 * 10/2024 Hobbs .................... H04L 65/61

* cited by examiner

*Primary Examiner* — Gigi L Dubasky
(74) *Attorney, Agent, or Firm* — Seed Intellectual Property Law Group LLP

(57) ABSTRACT

A content page management system is described herein. The system may identify a set of content presentation devices connected to a selected network. The system may receive an indication of content pages associated with the selected network that each include at least one instance of content, wherein a subset of content pages are live content pages. The system may receive input indicating that at least one content page is to be changed and may determine whether the content page is a live content page. In response to a determination that the content page is a live content page, the system may identify a subset of the set of content presentation devices that are currently accessing the at least one content page and cause the subset of content presentation devices to change their display of the content based on the identified changes. The system may update a data representation of the at least one content page based on the received input.

20 Claims, 9 Drawing Sheets

SYSTEMS AND METHODS FOR CONTENT PAGE CONFIGURATION

BACKGROUND

Various organizations provide access to Internet content, television content, or other content to their patrons, such as hotels, motels, hostels, cafes, or other organizations that provide access to content to their patrons. Such organizations typically provide one or more content pages to patrons that allow the patrons to access different types of content, content providers, etc. It is with respect to this and other considerations that the embodiments described herein have been made.

BRIEF SUMMARY

The embodiments disclosed herein improve technology that provides users with access to content when accessing one of many content presentation devices owned, maintained, managed, or otherwise associated with an organization by providing a technical solution for the creation of content pages that provide users with access to content from a plurality of sources. The embodiments disclosed herein may cause a live content page to be updated. A live content page may be any content page that is accessible to, currently presented by, or some combination thereof, a content presentation device.

In some embodiments, a content page includes one or more instances of live programming content. In such embodiments, a content page management system may generate instructions for a content presentation device to access a content stream based on an instance of live programming content. The content page management system may include data indicating the generated instructions in the content page such that the content presentation device is able to access a content stream and display the contents of the content stream upon receiving a representation of the content page.

In some embodiments, a content page includes one or more of: a type of content associated with a third-party application, a type of content associated with an entity associated with the set of content pages, a type of content associated with information regarding weather, or a type of content associated with information regarding one or more sporting events.

In some embodiments, a content page management system displays a user interface including: an indication of a content page of a set of content pages, an indication of one or more types of instances of content, and an indication of one or more types of page sections. In such embodiments, the user interface may be configured to receive input indicating a location on the content page at which a page section is to be placed. The user interface may be configured to format a depiction of an instance of content placed within an indicated location within the page section based on attributes of the page section. The user interface may update a data representation based on the input indicating the location at which the page section is to be placed, the location within the page section at which the instance of content is to be placed, and the formatted depiction of the instance of content.

In some embodiments, the content page management system may receive input generated in response to dragging a representation of a media file over an instance of content. In such embodiments, the content page management system may update a depiction of the instance of content based on the representation of the media file.

In some embodiments, the content page management system transmits instructions to change the presentation of at least one content page to one or more identified content presentation devices. The transmitted instructions may include an indication of one or more changes to the content page. The transmitted instructions may include instructions to re-render only aspects of the content page indicated by the one or more changes.

DETAILED DESCRIPTION

Figure 1:
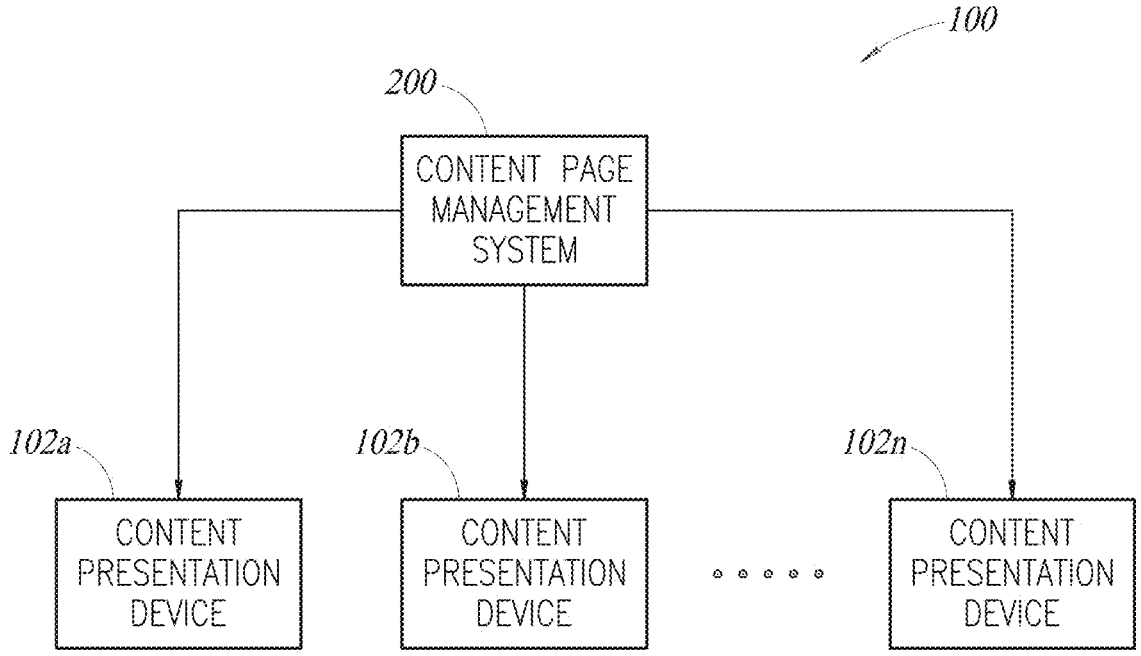
FIG. 1 is a display diagram of an example environment in which a content page management system may operate, according to various embodiments described herein.

Organizations typically allow their patrons to access content via content presentation devices associated with the respective organization, such as hotels, motels, hostels, cafes, libraries, or other organizations that provide access to content to their patrons. Such organizations manually create content pages that provide patrons (or "users") with access to content provided by, or through, the respective organization. Conventional systems to create and manage such content pages typically required users to be able to write computer code in order to create and change content pages. Furthermore, conventional systems are unable to update or otherwise change "live" content pages. A live content page may be a content page that the is able to be received by a content presentation device or a content page that is currently being displayed by a content presentation device. Thus, conventional systems require live content pages to be taken offline, to be updated at times during which they are unlikely to be used, etc., because conventional systems are unable to change live content pages.

The embodiments disclosed herein improve technology that provides users with access to content when accessing one of many content presentation devices owned, maintained, managed, or otherwise associated with an organization by providing a technical solution for the creation of content pages that provide users with access to content from a plurality of sources. The embodiments disclosed herein may cause a live content page to be updated.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments, and references to "some embodiments," "other embodiments," "example embodiments," "one embodiment," "an embodiment," etc., do not preclude the combination of the particular features, structures, or characteristics of any of the embodiments with any of the other embodiments described herein.

As used in this specification and the appended claims, the singular forms "a," "an," and "the" include plural referents unless the content clearly dictates otherwise. The term "or" is generally employed to include "and/or" unless the content clearly dictates otherwise. The term "and/or" is generally employed to include an inclusive or.

The headings and Abstract of the Disclosure provided herein are for convenience only and do not interpret the scope or meaning of the embodiments.

FIG. 1 is a display diagram of an example environment 100 in which a content page management system may operate, according to various embodiments described herein. The environment 100 includes a content page management system 200 (the "system 200") and one or more content presentation devices 102a-102n (collectively "content presentation devices 102" or individually as content presentation device 102).

The content presentation devices 102 may be one or more endpoint devices, such as televisions, projectors, PCs, tablets, laptop computers, smartphones, personal assistants, drones, Internet connection devices, vehicles, satellite antennas, other antennas, fleet tracking devices, USB dongles, Mi-Fi devices, customer premises equipment ("CPE"), wireless LAN, Wi-Fi, Worldwide Interoperability for Microwave Access (WiMax) devices, or the like, and may be communicatively coupled to the network or to each other so that the plurality of endpoint devices are communicatively coupled together. The content presentation devices 102 may be communicatively coupled to a network via interaction with an access point. The content presentation devices 102 may transmit, receive, or some combination thereof, content pages from a content page management system. In some embodiments, a content presentation device 102 is able to communicate with one or more content providers (not shown) to receive content that is presented to a user of the content presentation device 102.

The network within which the system 200 and content presentation devices 102 operate may be a network, communication system, or networked system (not shown), to which the system 200 and content presentation devices 102, may be coupled. Non-limiting examples of such a network or communication system include, but are not limited to, an Ethernet system, twisted pair Ethernet system, an intranet, a local area network (LAN) system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like.

In an example embodiment, the content presentation devices may be television sets located within the rooms of an organization such as a hotel. The organization may configure the content presentation devices, via the content page management system 200, to display one or more content pages that provide a patron of the hotel that accesses the content presentation device with content, information regarding content, etc. For example, the content page may be configured to provide the patron with information regarding the weather, events occurring in a geographical area within which the hotel is located, content provided by one or more television networks, access to one or more streaming services, information regarding the hotel, such as a room service menu, concierge information, or other hotel information, other content that a patron of a hotel may access, or some combination thereof.

In another example embodiment, the content presentation devices may be devices associated with patrons of an organization that access a network provided by the organization. In such an example, the organization may configure the content pages, via the content page management system 200, such that they are displayed to the user when the user opens a web browser via a content presentation device, when a user connects to a network associated with the organization via a content presentation device, or in other circumstances where a content presentation device associated with a user may receive content pages associated with the organization.

In the above example embodiments, the content page management system 200 may provide tools for the creation of content pages, for managing content pages, or performing other actions with respect to content pages. Furthermore, the content page management system 200 may update content pages, including content pages currently displayed by content presentation devices, based on changes to the content pages made by the organization.

Figure 2:
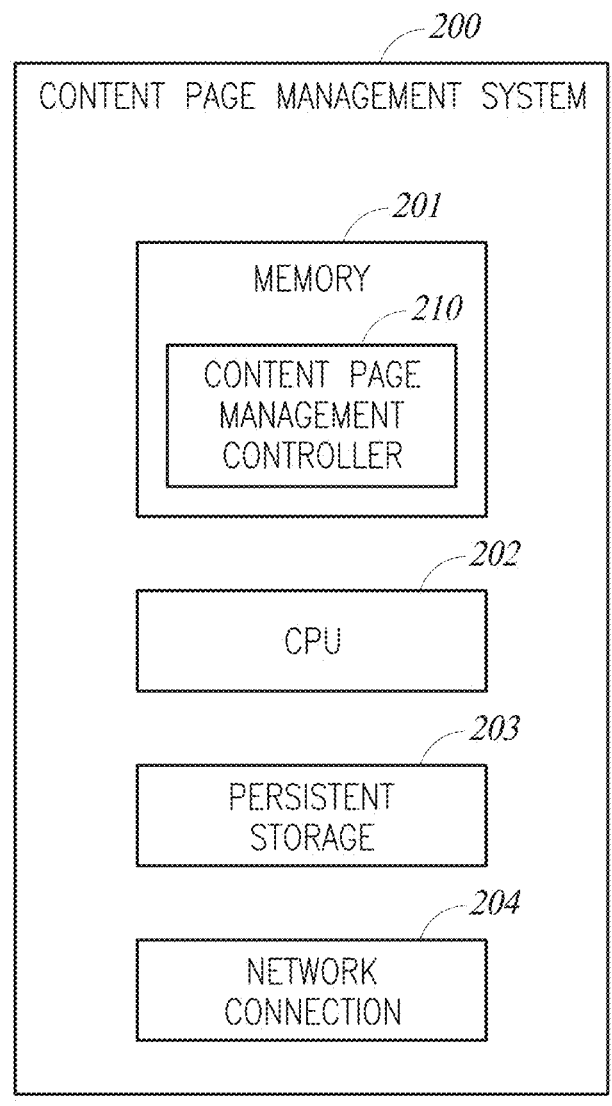
FIG. 2 is a block diagram of a content page management system, according to various embodiments described herein.

FIG. 2 is a block diagram of a content page management system 200, according to various embodiments described herein. One or more aspects of the content page management system 200 may be implemented or integrated on or in a content presentation device, such as a content presentation device 102, one or more computing devices, one or more servers, or some combination thereof.

In various embodiments, the system 200 includes one or more of the following: a computer memory 201, a processor 202, a persistent storage device 203, and a network connection 204. The memory 201 may be used for storing programs and data while they are being used, including data associated with the content pages, content presentation devices, representatives of an organization associated with the content presentation devices, an operating system including a kernel (not shown), device drivers (not shown), and one or more machine learning models. The processor 202 may be used for executing computer programs (not shown), such as computer programs which perform some or all of the functions of the system. In some embodiments, the processor 202 may be one or more processors, microcontrollers, or other computer components. In some embodiments, any of the processors, microcontrollers, or other computer components, either alone or in combination, can perform any of the functions or acts described herein. The persistent storage device 203 may be a hard drive or flash drive for persistently storing programs and data. The network connection 204 may be used for connecting to one or more cell towers or other computer systems (not shown), to send or receive data, such as via the Internet or another network and associated networking hardware, such as switches, routers, repeaters, electrical cables and optical fibers, light emitters and receivers, radio transmitters and receivers, and the like, and to scan for and retrieve signals associated with content presentation devices, a content management system, and for connecting to one or more computer devices such as devices associated with content presentation devices, a content management system, other devices or components associated with an organization associated with the content management system, devices or components associated with a representative of the organization, or other computer systems. In various embodiments, the system 200 additionally includes input and output devices, such as a keyboard, a mouse, display devices, etc.

While a system 200 configured as described may be used in some embodiments, in various other embodiments, the system 200 may be implemented using devices of various types and configurations and having various components. The memory 201 may include a content page management controller 210, which contains computer-executable instructions that, when executed by the CPU 202, cause the system 200 to perform the operations and functions described herein. For example, the programs referenced above, which may be stored in computer memory 201, may include or be comprised of such computer-executable instructions.

The content page management controller 210 (the "controller 210") performs the core functions of the system 200, as discussed herein and also with respect to FIGS. 3-9. In particular, the controller 210 receives input from representatives of an organization regarding management of, updates to, creation of, or other actions regarding content pages, and changes, alters, adjusts, creates, or otherwise manipulates content pages based on the received input. Additionally, the controller 210 may cause content presentation devices to update their display of a content page while the content presentation device is displaying the content page. The controller 210 may also perform other functions related to the functions of the system 200 described herein.

In an example embodiment, the controller 210 or computer-executable instructions stored on memory 201 of the system 200 are implemented using standard programming techniques. For example, the controller 210 or computer-executable instructions stored on memory 201 of the system 200 may be implemented as a "native" executable running on CPU 202, along with one or more static or dynamic libraries. In other embodiments, the controller 210 or computer-executable instructions stored on memory 201 of the system 200 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single processor computer system, or alternatively decomposed using a variety of structuring techniques known in the art, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented or performed by each component/module, and in different orders, and by different components/modules, yet still achieve the functions of the controller 200.

In addition, programming interfaces to the data stored as part of the controller 210 can be available by standard mechanisms such as through C, C++, C#, Java, and web APIs; libraries for accessing files, databases, or other data repositories; through scripting languages such as JavaScript and VBScript; or through Web servers, FTP servers, or other types of servers providing access to stored data. The controller 210 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the system 200.

Furthermore, in some embodiments, some or all of the components/portions of the controller 210, or functionality provided by the computer-executable instructions stored on memory 201 of the system 200 may be implemented or provided in other manners, such as at least partially in firmware or hardware, including, but not limited to, one or more application-specific integrated circuits (ASICs), standard integrated circuits, controllers (e.g., by executing appropriate instructions, and including microcontrollers or embedded controllers), field-programmable gate arrays (FPGAs), complex programmable logic devices (CPLDs), and the like. Some or all of the system components or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the content presentation devices; system 200; systems, applications, and functions, of the organization; etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

In some embodiments, aspects of the system 200 may be implemented in an application executed by a user device, content presentation device, or other computing device. In some such embodiments, some of the functions of the system 200, such as managing content pages, updating content pages, causing content presentation devices to update their display of a content page based on an update of the content page, creating content pages, or other functions of the system 200, may be performed by a computing device via execution of the application.

The operation of certain aspects will now be described with respect to FIGS. 3-9. In at least one of various embodiments, at least a portion of the processes 800 and 900 described in conjunction with FIGS. 8 and 9, respectively, may be implemented by one or more processors or executed via circuitry on one or more computing devices, such as the system 200 described in connection with FIG. 2, the content presentation devices 102 described in connection with FIG. 1, other computing devices, or some combination thereof. In at least one of various embodiments, the user interfaces 300, 400, 500, 600, and 700, described in conjunction with FIGS. 3-7 respectively are presented to a user associated with an organization via a computing device.

Furthermore, aspects of the user interfaces 300-700 and processes 800 and 900 may cause a content presentation device, the system 200, or another computing device to take an action, such as receiving data, displaying certain data, altering the display of data, transmitting data, or other actions. In some embodiments, causing a content presentation device, the system 200, or another computing device to take an action includes transmitting instructions to take the action to the content presentation device, the system 200, or another computing device, such as: via instructions included in a content page; instructions transmitted via a content presentation device, the system 200, or another computing device, other methods of transmitting instructions; or some combination thereof.

Figure 3:
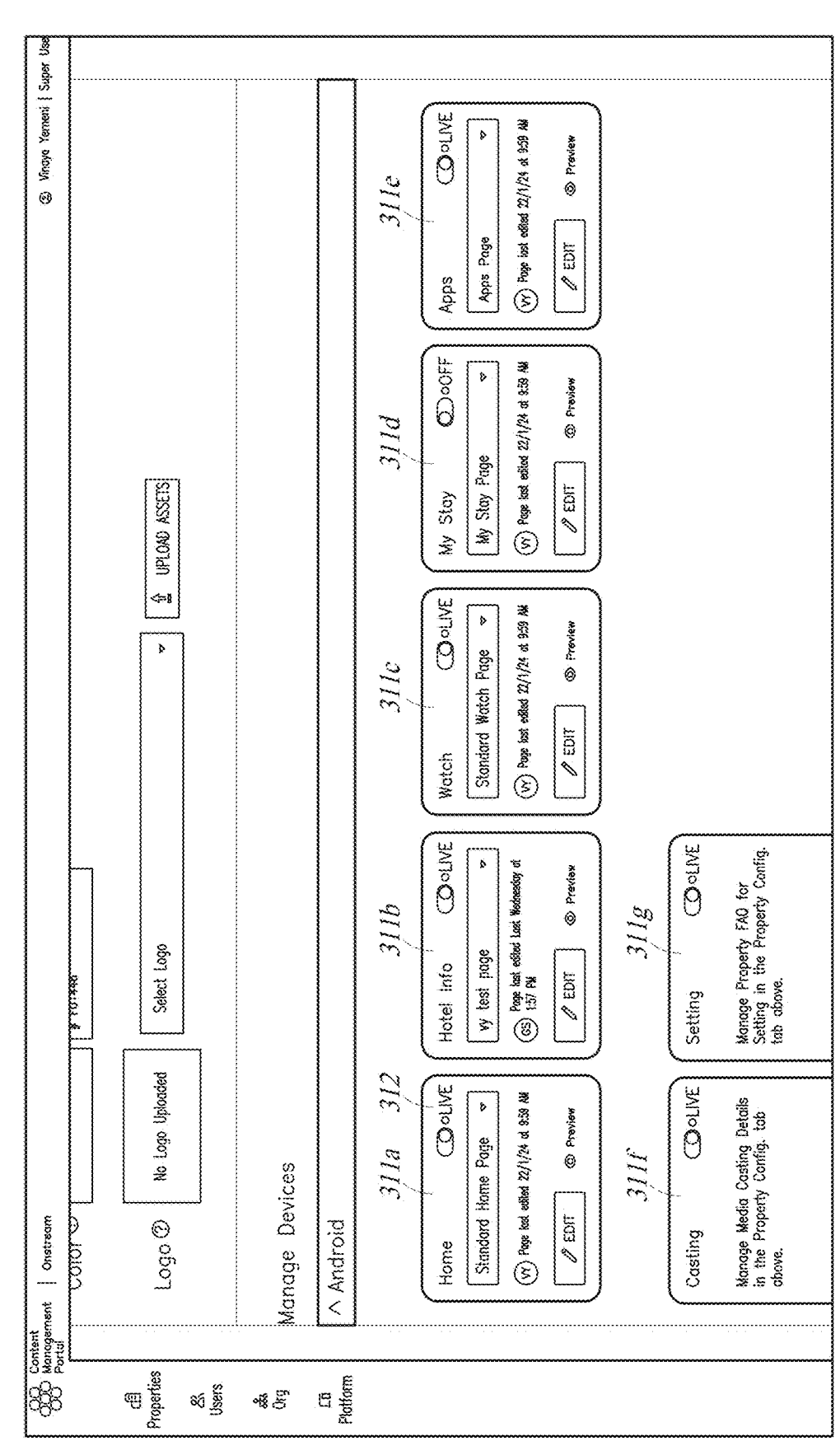
FIG. 3 is a display diagram of a properties user interface, according to various embodiments described herein.

FIG. 3 is a display diagram of a properties user interface 300 (or "user interface 300"), according to various embodiments described herein. The user interface 300 includes one or more content page user interface elements 311*a*-311*g* (collectively "user interface elements 311" or individually as user interface element 311). The user interface elements 311 may include a live page radio button, such as the live page radio button 312.

Each of the user interface elements 311 represent a content page that the system 200 may transmit to a content presentation device in response to a request by a content presentation device for a content page. For example, if the content presentation device is a television in a hotel, the television may, upon being turned on, request a "Home Page" from the system 200 that includes content related to the hotel and media services provided by the hotel. Furthermore, each of the user interface elements 311 include user interface components that, when interacted with by a user, allow a user to edit or preview the content page, select a content page template, or set a content page indicated by the respective user interface element 311 as a "live" content page. Interacting with the live page radio button 312 may cause the content page to be made available or unavailable to content presentation devices. Interacting with an "edit" button included in a user interface element 311 may cause the system 200 to display a page definition user interface, such as the page definition user interface 400, that a user of the system 200 may use to configure the content page indicated by the user interface element.

Figure 4:
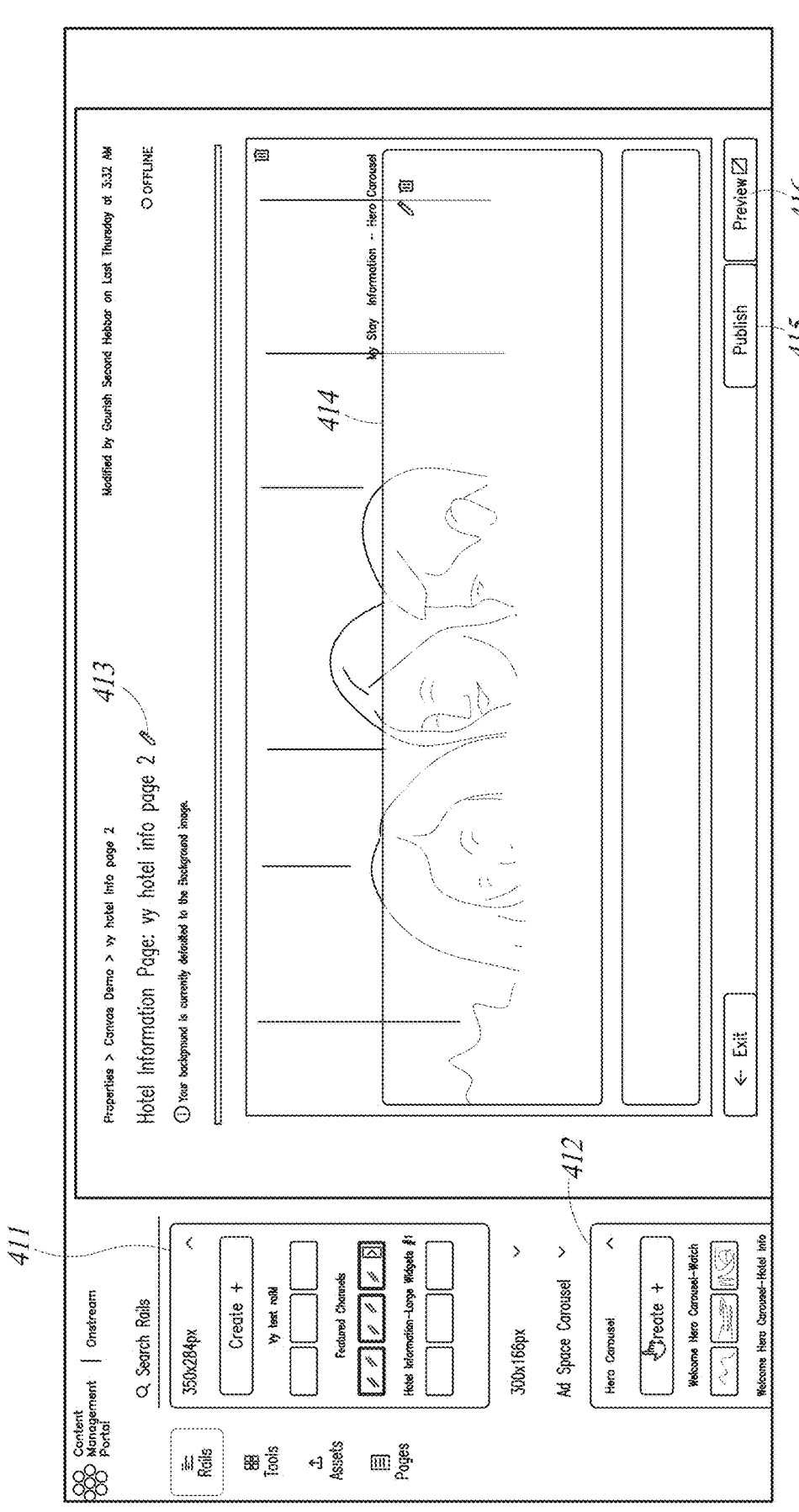
FIG. 4 is a display diagram of a first page definition user interface, according to various embodiments described herein.

FIG. 4 is a display diagram of a first page definition user interface 400 (or "user interface 400"), according to various embodiments described herein. The user interface 400 includes at least one rail user interface component, such as the rail user interface component 411 and 412, a title user interface element 413, at least one rail configuration user interface element 414, a publish button 415, and a preview button 416.

The rail user interface components 411 and 412 each indicate one or more predefined rail user interface elements, such as the rail user interface element 414. The predefined rail user interface elements may be configured such that instances of content included in the rail user interface element are formatted in a certain manner, displayed in a certain manner, etc. For example, the rail user interface component 411 indicates that instances of content included in a rail user interface element specified in the rail user interface component 411 are formatted to be displayed at a resolution of 350×284. In another example, the rail user interface component 412 indicates that instances of content are displayed in a "carousel," such that one instance of content is displayed differently than other instances of content included in the rail user interface element, and that the instance of content that is displayed differently is rotated with other instances of content, such that each of the instances of content may be displayed differently at different times. In some embodiments, a rail user interface component, such as the rail user interface components 411 and 412, includes a user interface element that allows a user to specify that a new rail user interface element is to be created, instead of using a predefined rail user interface element.

The rail user interface elements, such as the rail user interface element 414, include zero or more instances of content. Furthermore, the system 200 configures the rail user interface elements to format instances of content contained by a rail user interface element based on attributes of the rail user interface element. For example, the rail user interface element may have an attribute indicating that instances of content contained in the rail user interface element are to be displayed at a particular resolution. The system 200 may detect that an instance of content is to be included in a rail user interface element and format the instance of content based on the resolution attribute of the rail user interface element.

The title user interface element 413 indicates a title for the content page. Interacting with the publish button 415 causes the system 200 to "publish" the content page. The system 200 may publish the content page by making the content page available to a user of the system 200 via the properties user interface 300, updating or creating a data representation of the content page, causing display devices that are currently displaying the content page to alter the displayed content page based on the published content page, or other methods, actions, etc., of making a content page available to a content presentation device or the system 200. Interacting with the preview button 416 causes the system 200 to display a preview of the content page as it would be displayed on one or more content presentation devices. In some embodiments, the preview is generated based on attributes of one or more selected content presentation devices, such as a resolution, screen size, type of device, or other attributes of a content presentation device.

Interacting with a "tools" button included in the first page definition user interface 400 may cause the system 200 to present a second page definition user interface, such as the second page definition user interface 500.

Figure 5:
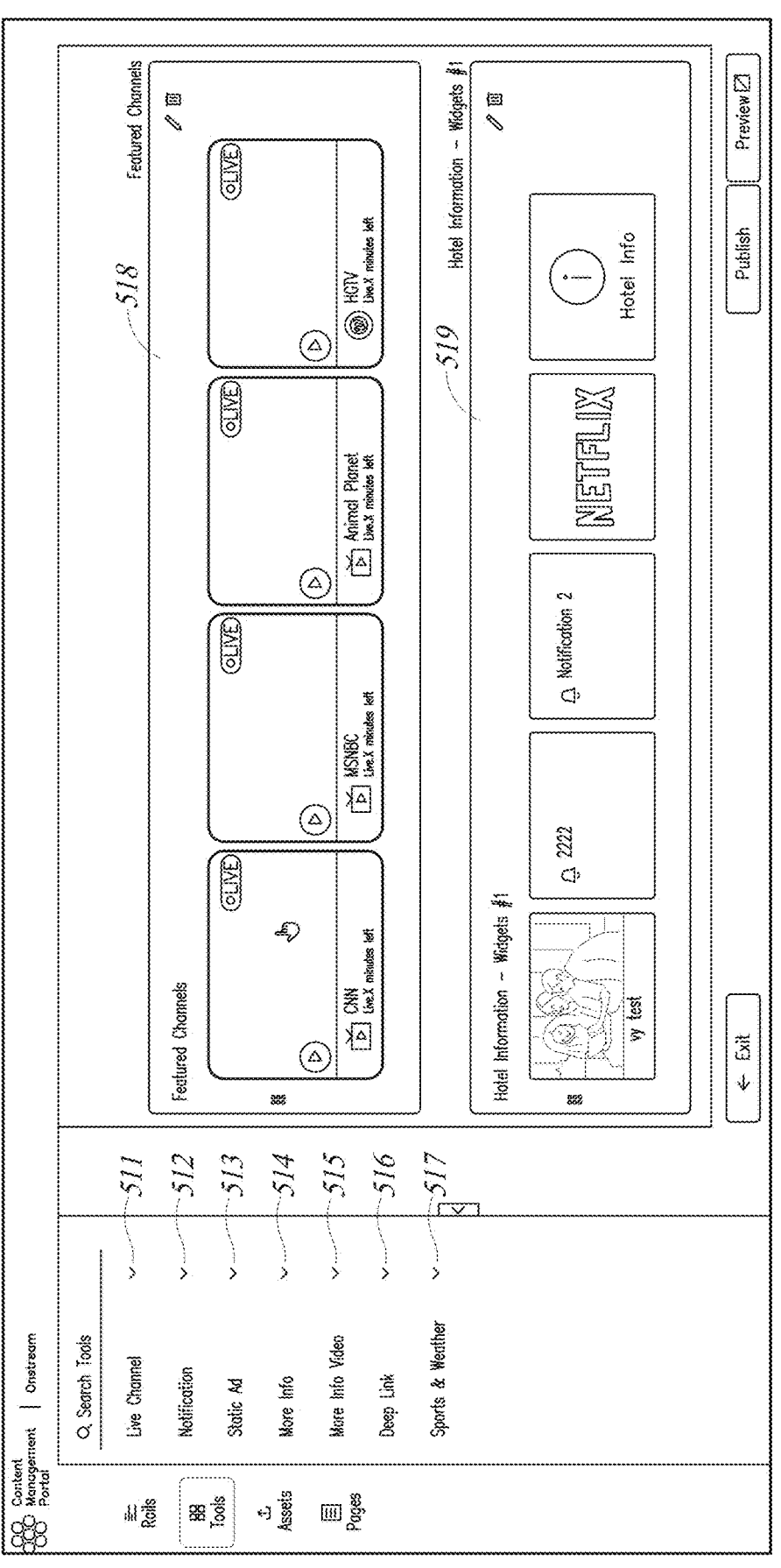
FIG. 5 is a display diagram of a second page definition user interface, according to various embodiments described herein.

FIG. 5 is a display diagram of a second page definition user interface 500 (or "user interface 500"), according to various embodiments described herein. The user interface 500 includes a live channel tool 511, a notification tool 512, a static advertisement tool 513, an information tool 514, a video information tool 515, a deep link tool 516, and a sports and weather tool 517 (collectively "tools 511-517"). The user interface 500 additionally includes two rail user interface elements 518 and 519, that each include instances of content generated via one of the tools 511-517. Each of the tools 511-517 may be used to include one or more types of instances of content within a rail user interface element, such as the rail user interface elements 517 and 518. Furthermore, each of the tools 511-517 may include one or more instances of content associated with a type of content indicated by the respective tool that a user may select for inclusion within a rail user interface element.

Interacting with the live channel tool 511 allows a user to identify a live stream generated by one or more content providers for inclusion within a rail user interface element, such as the rail user interface element 518. In some embodiments, the system 200 configures a content page that includes a live stream type of content to include instructions for a content presentation device to identify a content provider associated with the identified live stream and display the live stream within an instance of content.

Interacting with the notification tool 512 allows a user to include an instance of content that displays one or more notifications to a user of a content presentation device. In some embodiments, the system 200 configures a content page that includes a notification type of content to cause a content presentation device to receive information indicating a notification from the system 200, another computing system, or some combination thereof. In such embodiments, the content page may be further configured to cause the content presentation device to display the notification via a notification type of content included in the content page.

Interacting with the static advertisement tool 513 allows a user to include an instance of content that displays an advertisement to a user of a content presentation device. In some embodiments, the system 200 configures a content page that includes a static advertisement type of content to cause a content presentation device to receive an indication of one or more advertisements from the system 200, another computing system, or some combination thereof. In some embodiments, the system 200, content presentation device, another computing system, or some combination thereof, may receive an indication of one or more attributes of a user of the content presentation device, such as one or more demographics of the user, a time period within which the user is a patron of the organization associated with the content presentation device, other attributes of the user, or some combination thereof. In some embodiments, the system 200, content presentation device, another computing system, or some combination thereof, may receive an indication of one or more attributes of an organization associated with the content presentation device, such as a type of the organization, a function of the organization, other attributes of the organization, or some combination thereof. In some embodiments, the system 200, content presentation device, another computing system, or some combination thereof, may receive an indication of one or more attributes of the content presentation device, such as a type of the content presentation device, a function of the content presentation device, other attributes of the content presentation device, or some combination thereof. In some embodiments, the advertisement is selected based on at least one attribute of the user, at least one attribute of the organization, at least one attribute of the content presentation device, or some combination thereof.

Interacting with the information tool 514 allows a user to include an instance of content that displays information to a user of the content presentation device. In some embodiments, an information type of content may include information associated with one or more of: an organization associated with the content presentation device, a user of the content presentation device, the content presentation device, a geographic area, other types of information, or some combination thereof. For example, if the organization is a hotel, the information type of content may include information regarding one or more of: a room service menu, telephone numbers associated with the hotel, a map of the hotel, facilities or services provided by the hotel, or other types of information associated with the hotel. In some embodiments, the information type of content may be configured to receive user input regarding the information that is transmitted to a computing device associated with the organization. For example, if the organization is a hotel and the information is related to a room service menu, the information type of content may be configured to receive input associated with a room service order placed by a user of the content presentation device.

Interacting with the information video tool 515 allows a user to include an instance of content that displays a video containing information to a user of the content presentation device. For example, the video may be a video that indicates any of the information described above with respect to the information tool 514.

Interacting with the deep link tool 516 allows a user to include an instance of content that indicates a link to an instance of content that is stored in a system external to the system of the organization (such as a system that is not controlled, managed, etc., by the organization), an internal system of the organization, or some combination thereof. For example, the link may be a link to a website, service, other computing system, or some combination thereof. The instance of content specified by the link may be a website, a content page, a document, another type of content, or some combination thereof. In some embodiments, interacting with the link causes the content presentation device to display the instance of content specified by the link. For example, a deep link may specify a local news website, and the user may access the local news website by interacting with the deep link. In another example, the deep link may specify an application, such as a streaming service application, and interacting with the deep link causes the content presentation device to launch the application.

Interacting with the sports and weather tool 517 allows a user to include an instance of content that indicates sports information, weather information, or some combination thereof. In some embodiments, the system 200 configures a content page that includes a sports information type of content or weather information type of content to cause a content presentation device to receive an indication of sports information, weather information, or some combination thereof, from the system 200, another computing system, or some combination thereof. In some embodiments, the sports information includes information associated with sports teams, sporting events, other sport information, or some combination thereof. In some embodiments, the sports information is received based on a geographic area within which the content presentation device, organization, user, or some combination thereof, is located. In some embodiments, the weather information is weather information received based on a geographic area within which the content presentation device, organization, user, or some combination thereof, is located.

Although the tools 511-517 each include tools to include live stream types of content, notification types of content, advertisement types of content, information types of content, video information types of content, link types of content, sports types of content, and weather types of content in a content page, embodiments are not so limited, and the tools 511-517 or other tools may be used to include other types of content in a content page. For example, other types of content may be content configured to allow a user to access additional content provided by one or more entities, such as a streaming service content providers, a broadcast television content provider, a radio content provider, a music streaming content provider, other types of content providers, or some combination thereof, an entity associated with an advertisement; content associated with a game; other types of content; or some combination thereof.

Interacting with a tool 511-517 included in the second page definition user interface 500 may cause the system 200 to present another page definition user interface. For example, interacting with the live channel tool 511 may cause the system 200 to present the third page definition user interface 600.

Figure 6:
FIG. 6 is a display diagram of a third page definition user interface, according to various embodiments described herein.

FIG. 6 is a display diagram of a third page definition user interface 600 (or "user interface 600"), according to various embodiments described herein. The user interface 600 includes a live channel tool 611 and a rail user interface element 612. The live channel tool 611 is an example of a live channel tool 511 that may be used to include a content stream associated with a content provider. As indicated by the live channel tool 611, the content stream may be a content stream associated with a pre-selected content provider, a content provider selected by a user, or some combination thereof. Furthermore, as indicated by the rail user interface element 612, and as described above in connection with the rail user interface element 414 described above in connection with FIG. 4, the system 200 may automatically format the live channel type of content, or other types of content, selected by the user based on one or more attributes of the rail user interface element within which the live stream type of content is included.

Although the live channel tools 611 and 511 are described as being associated with a live stream of content, embodiments are not so limited, and other streams of content, such as streams that are not currently being aired by a content provider, may be inserted into a rail user interface element, such as the rail user interface element 612, by interacting with a live channel tool, such as the live channel tools 611 and 511.

Interacting with an "assets" button included in the third page definition user interface 600 may cause the system 200 to present an assets definition user interface, such as the assets definition user interface 700.

Figure 7:
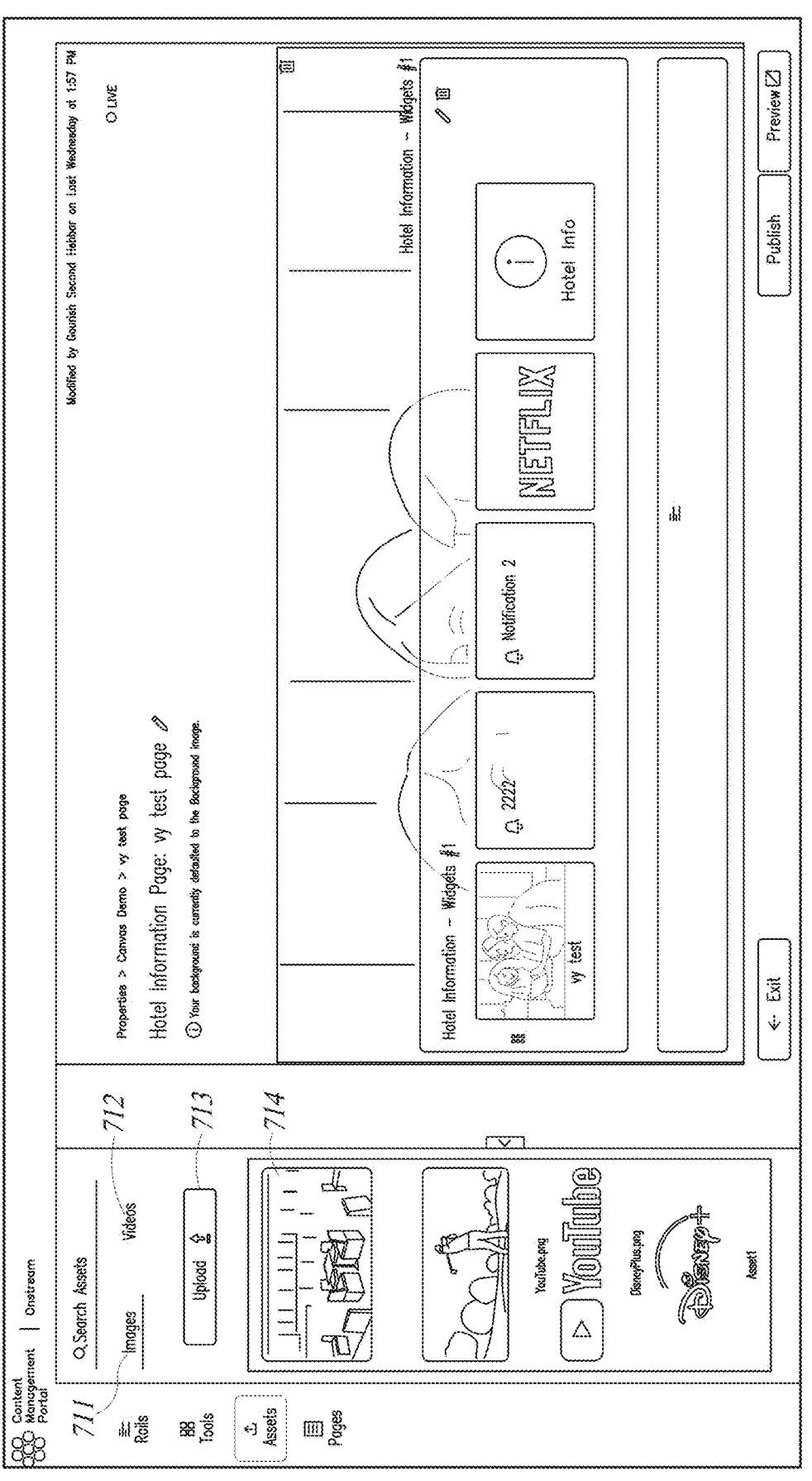
FIG. 7 is a display diagram of an assets definition user interface, according to various embodiments described herein.

FIG. 7 is a display diagram of an assets definition user interface 700 (or "user interface 700"), according to various embodiments described herein. The user interface 700 includes an images button 711, a videos button 712, an upload button 713, and one or more assets, such as the asset 714. The assets, such as the asset 714, may include one or more images, videos, other visual or audio representations of data, or some combination thereof, that may be included in a rail user interface element. In some embodiments, the user interface 700 is configured such that a user may use a peripheral device, such as a mouse, keyboard, or other peripheral device, to select an asset and drag the asset such that at least a portion of the asset is on top of an instance of content. In such embodiments, the system 200 may receive an indication that the selected asset has been dragged such that at least a portion of the asset is on top of an instance of content. In response to receiving the indication, the system 200 may update the instance of content to include the dragged asset.

Interacting with the images button 711 causes the user interface 700 to display assets that are images. Interacting with the videos button 712 causes the user interface 700 to display assets that are videos. In some embodiments, causing the user interface to display assets that are images or videos includes presenting an upload button, such as the upload button 713. Interacting with the upload button 713 allows a user to select data indicating an asset that is not already accessible by the system 200. In some embodiments, the selected data may be an indication of a data file stored on a computing system, a link to a data file stored on a computing system, another type of indication of a data file, or some combination thereof.

Although the user interfaces 300-700 are described above as being displayed in a sequential order, embodiments are not so limited, and the user interfaces 300-700, as well as other user interfaces, may by displayed to a user in any order.

Figure 8:
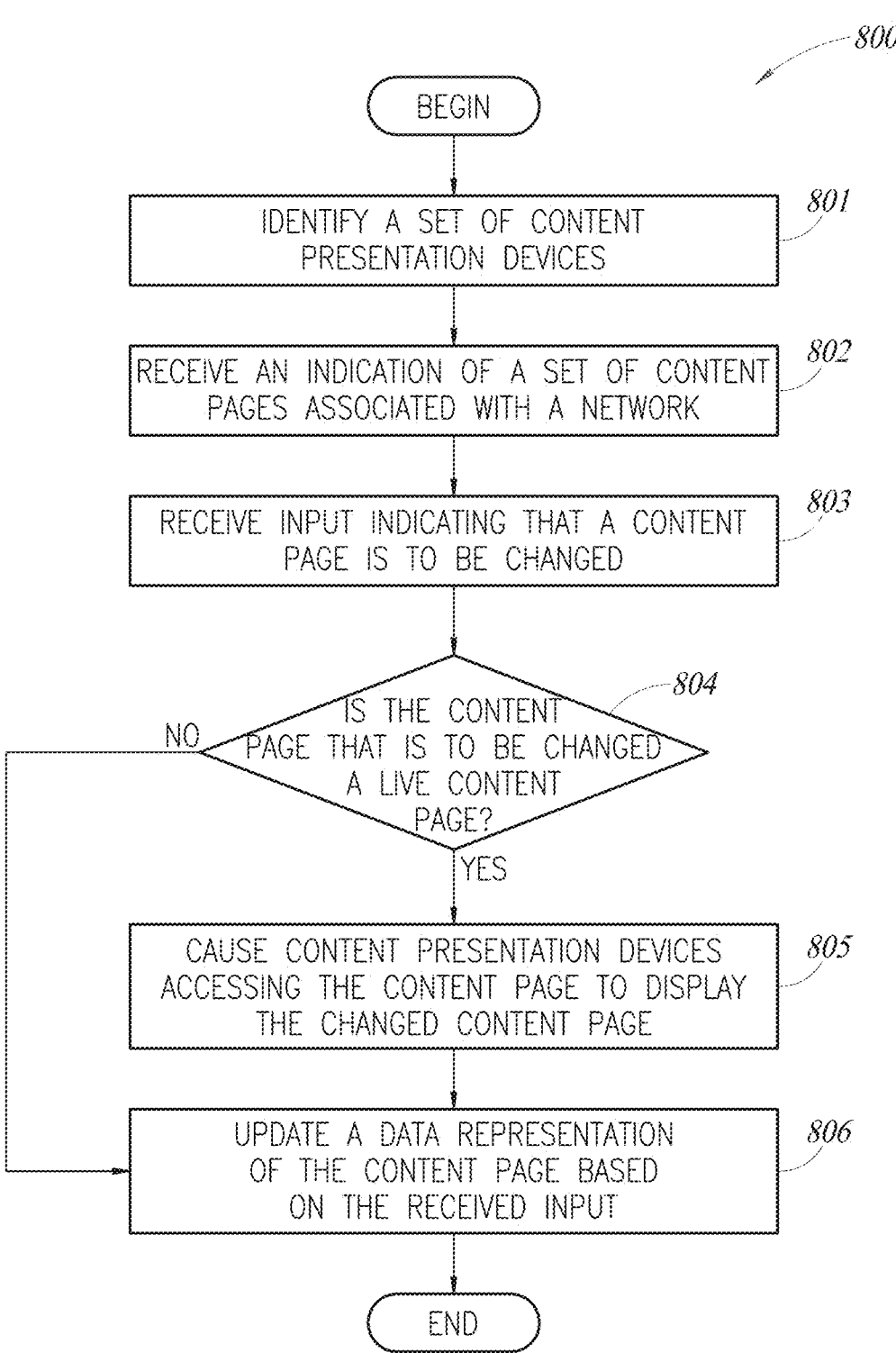
FIG. 8 is a flow diagram of a process for changing live content pages, according to various embodiments herein.

FIG. 8 is a flow diagram of a process 800 for changing live content pages, according to various embodiments herein. Any of the aspects of the process 800 may be performed by a content page management system, such as the system 200 described above with respect to FIGS. 1 and 2, a content presentation device, another computing device, or some combination thereof. In some embodiments, as part of performing the acts included in the process 800, the system performs one or more of the acts included in the processes 900 described below in connection with FIG. 9.

The process 800 begins, after a start block, at act 801, where a system 200 identifies a set of content presentation devices. The set of content presentation devices may include one or more content presentation devices connected to at least one network associated with an organization. In some embodiments, the set of content presentation devices are identified by: detecting content presentation devices currently connected to the at least one network; detecting a make or model of the content presentation devices; accessing a data repository that includes data specifying content presentation devices associated with the organization; detecting an identifier of each of the content presentation devices; other methods of identifying content presentation devices; or some combination thereof.

The process 800 proceeds to act 802, where the system 200 receives an indication of a set of content pages associated with the network, the organization, or some combination thereof. In some embodiments, the set of content pages are stored in a data repository that stores data indicating content pages. In such embodiments, the content pages include in the set of content pages may have been generated by the system 200 or another computing system. The system 200 may receive the indication of the set of content pages in response to a request to the data repository for the set of content pages.

The process 800 proceeds to act 803, where the system 200 receives input indicating that a content page is to be changed. In some embodiments, the input indicating that a content page is to be changed may be received via one or more user interfaces, such as the user interfaces 300-700 described above in connection with FIG. 3-7.

The process 800 proceeds to act 804, where the system 200 determines whether the content page that is to be changed is a live content page. In some embodiments, the system 200 makes the determination in act 804 based on data stored in the data repository of content pages that indicates that the content page is live. If the content page is a live content page, the process 800 proceeds to act 805, otherwise, the process 800 proceeds to act 806.

At act 805, the system 200 causes one or more content presentation devices that are currently accessing the content page to display the changed content page. In some embodiments, the system 200 performs act 805 by performing the process 900 described below in connection with FIG. 9.

The process 800 proceeds to act 806, where the system 200 updates a data representation of the content page based on the received input. In some embodiments, the system 200 updates the representation of the content page by generating data indicating the updates to the content page and transmitting a query to the data repository indicating that the data representation of the content page should be updated based on the generated data.

In some embodiments, the system 200 performs acts 805 and 806 contemporaneously.

After act 806, the process 800 ends.

Figure 9:
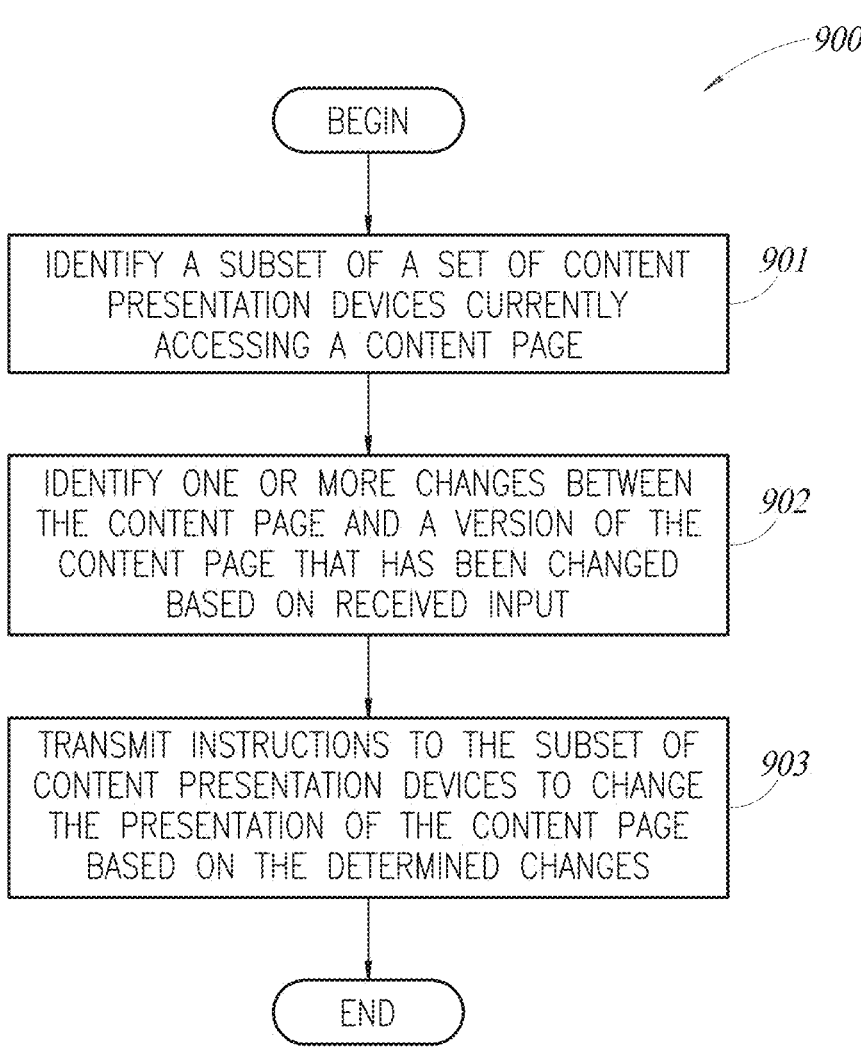
FIG. 9 is a flow diagram of a process for causing content presentation devices to update a currently displayed content page, according to various embodiments described herein.

FIG. 9 is a flow diagram of a process 900 for causing content presentation devices to update a currently displayed content page, according to various embodiments described herein. Aspects of the process 900 may be performed by a content page management system, such as the system 200 described above with respect to FIGS. 1 and 2, a content presentation device, another computing device, or some combination thereof.

The process 900 begins, after a start block, at act 901, where the system 200 identifies a subset of a set of content presentation devices currently accessing a content page. In some embodiments, the content page management system tracks the content pages accessed, requested, or otherwise used by one or more content presentation devices. In such embodiments, the content page management system may flag a content presentation device as accessing a content page when the content presentation device requests, accesses, or otherwise uses a content page. In such embodiments, the content page management system may identify the subset of content presentation devices based on a determination that one or more content presentation devices are flagged as accessing a content page. In some embodiments, the content page management system determines which content page to transmit to a content presentation device based on a type of the content presentation device, such as whether the content presentation device is a smartphone, television, tablet, laptop computer, or other type of content presentation device.

The process 900 proceeds to act 902, where the system 200 identifies one or more changes between a previous version of the content page and a version of the content page that has been changed based on the received input. In some embodiments, the system 200 performs act 902 by comparing the previous version of the content page with the version of the content page that has been changed. The previous version of the content page may be a version of the content page that is currently being accessed by a content presentation device. In some embodiments, the changes include a change in one or more configuration settings of the content page.

The process 900 proceeds to act 903, where the system 200 transmits instructions to the subset of content presentation devices to change the presentation of the content page based on the determined changes. In some embodiments, the instructions include instructions to change only the aspects of the content page that have changed based on the determined changes. In some embodiments, in response to receiving the instructions, the subset of content presentation devices change the display of the content page based on the determined changes to the content page. In some embodiments, the instructions include an indication of one or more changed configuration settings for the content page.

In some embodiments, where multiple content pages are included in the subset of content pages, the content presentation devices may be configured to update the content pages contemporaneously.

After act 903, the process 900 ends.

In some embodiments, as part of performing any one or more of the acts 801-806 or acts 901-903, the system 200 detects a role of the user of the system 200. In some embodiments, the system 200 restricts the changes that can be made to a content page based on the detected role of the user of the system 200.

In some embodiments, the content page management system stores one or more configurations of content pages. In some such embodiments, the configurations may be stored hierarchically based on a property or attribute specified by each of the configurations. For example, the content page management system may have a configuration hierarchy with four levels, 1) property level, 2) zone level, 3) device or platform level, and 4) page template. The content page management system may determine which configuration settings are to be transmitted to the content presentation device based on data included in a request for the content page that indicates the configuration of the content page for the content presentation device that transmitted the request. For example, a request may include data indicating one or more of: a content page, a type of device requesting the content page, an entity that manages the content page, an area within a building associated with an organization, a time, a user of the content presentation device, other data relevant to a request, or some combination thereof. In an example, a request by a television in a hotel may include an indication of a model of the television, an indication of the room in which the television is located, an indication of an identity of a user of the television, an indication of the hotel, and an indication of the current time.

In some embodiments, the content page management system causes the content presentation device to cache the configuration data for one or more content pages. In some embodiments, causing the content presentation device to cache the configuration data for one or more content pages includes transmitting instructions to do so to the content presentation device. In some embodiments, the content presentation device receives instructions from the content page management system to update one or more cached content pages. In some such embodiments, transmitting the instructions to update the cached content pages is performed as part of the process 900 described above with respect to FIG. 9. In some embodiments, the content presentation device receives an indication of whether a content page has been updated from the content page management system. In such embodiments, the content presentation device may transmit a message to the content page management system requesting the indication of whether the content page has been updated. In some such embodiments, the content presentation device may periodically transmit the message.

In some embodiments, causing the content pages to be cached by the content presentation devices improves the functioning of the content page management system and the data repositories used as part of the content page management system. For example, caching the content pages reduces the number of times a content presentation device must request a content page from the content page management system, because the content page is already present in the memory of the content presentation device. In another example, the reduction in the number of requests to the content page management system results in a reduction in operations to generate configuration settings for content presentation devices in response to those requests. Thus, the functions of the content page management system are able to be performed by less powerful computing devices and hardware than conventional systems because the total number of requests and configuration generation is reduced when compared to conventional systems. Furthermore, caching the content pages reduces the amount of time needed to present content pages to a user via the content presentation device because the data used to display the content page is already present on the content presentation device and does not need to be retrieved again. In some embodiments, the content presentation device may use the cached configuration in the event that the content presentation device is unable to communicate with the content page management system. In some embodiments, the content page management system caches configuration data for one or more content pages, such as configuration data generated in response to a request by the content presentation devices. In such embodiments, the content page management system may determine whether a content page configuration cached by the content page management system is able to be used by a content presentation device requesting a content page. In such embodiments, the content page management system may compare the cached configuration to the request. In some embodiments, based on a determination that the cached configuration can be used by the content presentation device, the content page management system transmits the cached configuration in response to the request. In such embodiments, the content page management system is able to reduce the number of times that a configuration for a content page is generated, thereby conserving computing resources that would otherwise be used to generate the configuration, such as processing cycles and memory.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:

at least one processor; and at least one non-transitory computer readable media storing processor-executable instructions or data, the instructions or data, when executed by the at least one processor, cause the system to:

identify a set of content presentation devices connected to a selected network, the content presentation devices being configured to access a content page;

receive an indication of a set of content pages associated with the selected network, wherein each content page of the set of content pages includes one or more instances of content, wherein a subset of the set of content pages are live content pages;

receive input indicating that at least one content page of the set of content pages is to be changed;

determine whether the at least one content page is a live content page based on the subset of the set of content pages that are live content pages;

based on a determination that the at least one content page is a live content page:

identify a subset of the set of content presentation devices that are currently accessing the at least one content page;

identify one or more changes between the at least one content page and a version of the at least one content page that has been changed based on the received input;

transmit data to the subset of content presentation devices, the data including instructions to change a presentation of the at least one content page based on the identified one or more changes; and update a data representation of the at least one content page based on the received input, such that content presentation devices that access the at least one content page receive data indicating the version of the at least one content page that has been changed based on the received input.

2. The system of claim 1, wherein at least one instance of content included in a content page of the set of content pages is a live program type of content, and wherein the instructions or data, when executed by the at least one processor, cause the system to:

generate instructions for a content presentation device to access a content stream based on the at least one instance of content; and include data indicating the generated instructions in the content page, such that a content presentation device, upon receiving the content page, is able to access the content stream and display contents of the content stream within the content page.

3. The system of claim 1, wherein at least one instance of content included in a content page of the set of content pages is one or more of:

a type of content associated with a third-party application;

a type of content associated with an entity associated with the set of content pages;

a type of content associated with information regarding weather; and a type of content associated with information regarding one or more sporting events.

4. The system of claim 1, wherein, to receive the input, the instructions or data, when executed by the at least one processor, further cause the system to:

display a user interface, the user interface including:

an indication of a content page of the set of content pages;

an indication of one or more types of instances of content; and an indication of one or more types of page sections; and wherein the user interface is configured to:

receive input indicating a location on the content page at which a page section is to be placed, each page section including one or more attributes;

receive input indicating a location within a page section at which a selected instance of content is to be placed;

in response to receiving the input indicating the location within the page section, formatting a depiction of the selected instance of content based on the one or more attributes of the page section; and update the data representation of the content page based on the input indicating the location at which the page section is to be placed, the input indicating the location within the page section at which the selected instance of content is to be placed, and the formatted depiction of the selected instance of content.

5. The system of claim 4, wherein the instructions or data, when executed by the at least one processor, further cause the system to:

receive input generated in response to dragging a representation of a media file over an instance of content; and update a depiction of the instance of content based on the representation of the media file.

6. The system of claim 1, wherein the instructions to change the presentation of at least one content page comprise an indication of the one or more changes and instructions to re-render only aspects of the at least one content page indicated by the one or more changes.

7. The system of claim 1, wherein to identify a set of content presentation devices connected to a selected network, the instructions or data, when executed by the at least one processor, further cause the system to:

detect one or more content presentation devices connected to the selected network;

receive an identifier for each of the one or more content presentation devices, the identifier for at least a portion of the content presentation devices indicating an entity associated with the selected network; and identify the set of content presentation devices based on the received identifier for each of the one or more content presentation devices.

8. A non-transitory processor-readable storage medium that stores at least one of instructions or data, the instructions or data, when executed by at least one processor, cause the at least one processor to perform a method comprising:

identifying a set of content presentation devices connected to a selected network, the content presentation devices being configured to access a content page;

receiving an indication of a set of content pages associated with the selected network, wherein each content page of the set of content pages includes one or more instances of content, wherein a subset of the set of content pages are live content pages;

receiving input indicating that at least one content page of the set of content pages is to be changed;

determining whether the at least one content page is a live content page based on the subset of the set of content pages that are live content pages;

based on a determination that the at least one content page is a live content page:

identifying a subset of the set of content presentation devices that are currently accessing the at least one content page;

identifying one or more changes between the at least one content page and a version of the at least one content page that has been changed based on the received input;

transmitting data to the subset of content presentation devices, the data including instructions to change a presentation of the at least one content page based on the identified one or more changes; and updating a data representation of the at least one content page based on the received input, such that content presentation devices that access the at least one content page receive data indicating the version of the at least one content page that has been changed based on the received input.

9. The non-transitory processor-readable storage medium of claim 8, wherein at least one instance of content included in a content page of the set of content pages is a live program type of content, and wherein the method further comprises:

generating instructions for a content presentation device to access a content stream based on the at least one instance of content; and including data indicating the generated instructions in the content page, such that a content presentation device, upon receiving the content page, is able to access the content stream and display contents of the content stream within the content page.

10. The non-transitory processor-readable storage medium of claim 8, wherein at least one instance of content included in a content page of the set of content pages is one or more of:

a type of content associated with a third-party application;

a type of content associated with an entity associated with the set of content pages;

a type of content associated with information regarding weather; or a type of content associated with information regarding one or more sporting events.

11. The non-transitory processor-readable storage medium of claim 8, wherein receiving the input further comprises:

displaying a user interface, the user interface including:

an indication of a content page of the set of content pages;

an indication of one or more types of instances of content; and an indication of one or more types of page sections; and wherein the user interface is configured to:

receive input indicating a location on the content page at which a page section is to be placed, each page section including one or more attributes;

receive input indicating a location within a page section at which a selected instance of content is to be placed;

in response to receiving the input indicating the location within the page section, formatting a depiction of the selected instance of content based on the one or more attributes of the page section; and update the data representation of the content page based on the input indicating the location at which the page section is to be placed, the input indicating the location within the page section at which the selected instance of content is to be placed, and the formatted depiction of the selected instance of content.

12. The non-transitory processor-readable storage medium of claim 11, wherein the method further comprises:

receiving input generated in response to dragging a representation of a media file over an instance of content; and updating a depiction of the instance of content based on the representation of the media file.

13. The non-transitory processor-readable storage medium of claim 8, wherein the instructions to change the presentation of at least one content page comprise an indication of the one or more changes and instructions to re-render only aspects of the at least one content page indicated by the one or more changes.

14. A method comprising:

identifying a set of content presentation devices connected to a selected network, the content presentation devices being configured to access a content page;

receiving an indication of a set of content pages associated with the selected network, wherein each content page of the set of content pages includes one or more instances of content, wherein a subset of the set of content pages are live content pages;

receiving input indicating that at least one content page of the set of content pages is to be changed;

determining whether the at least one content page is a live content page based on the subset of the set of content pages that are live content pages;

based on a determination that the at least one content page is a live content page:

identifying a subset of the set of content presentation devices that are currently accessing the at least one content page;

identifying one or more changes between the at least one content page and a version of the at least one content page that has been changed based on the received input;

transmitting data to the subset of content presentation devices, the data including instructions to change a presentation of the at least one content page based on the identified one or more changes; and updating a data representation of the at least one content page based on the received input, such that content presentation devices that access the at least one content page receive data indicating the version of the at least one content page that has been changed based on the received input.

15. The method if claim 14, wherein at least one instance of content included in a content page of the set of content pages is a live program type of content, and wherein the method further comprises:

generating instructions for a content presentation device to access a content stream based on the at least one instance of content; and including data indicating the generated instructions in the content page, such that a content presentation device, upon receiving the content page, is able to access the content stream and display contents of the content stream within the content page.

16. The method of claim 14, wherein at least one instance of content included in a content page of the set of content pages is one or more of:

a type of content associated with a third-party application;

a type of content associated with an entity associated with the set of content pages;

20 a type of content associated with information regarding weather; or a type of content associated with information regarding one or more sporting events.

17. The method of claim 14, wherein receiving the input further comprises:

displaying a user interface, the user interface including:

an indication of a content page of the set of content pages;

an indication of one or more types of instances of content; and an indication of one or more types of page sections; and wherein the user interface is configured to:

receive input indicating a location on the content page at which a page section is to be placed, each page section including one or more attributes;

receive input indicating a location within a page section at which a selected instance of content is to be placed;

in response to receiving the input indicating the location within the page section, formatting a depiction of the selected instance of content based on the one or more attributes of the page section; and update the data representation of the content page based on the input indicating the location at which the page section is to be placed, the input indicating the location within the page section at which the selected instance of content is to be placed, and the formatted depiction of the selected instance of content.

18. The method of claim 17, wherein the method further comprises:

receiving input generated in response to dragging a representation of a media file over an instance of content; and updating a depiction of the instance of content based on the representation of the media file.

19. The method of claim 14, wherein the instructions to change the presentation of at least one content page comprise an indication of the one or more changes and instructions to re-render only aspects of the at least one content page indicated by the one or more changes.

20. The method of claim 14, wherein to identify a set of content presentation devices connected to a selected network, the method further comprises:

detecting one or more content presentation devices connected to the selected network;

receiving an identifier for each of the one or more content presentation devices; and identifying the set of content presentation devices based on the received identifier for each of the one or more content presentation devices.

* * * * *